L. SCHNEIDER.
COMBINATION FEED TROUGH AND WATER FOUNTAIN.
APPLICATION FILED DEC. 6, 1911.
1,030,130. Patented June 18, 1912.
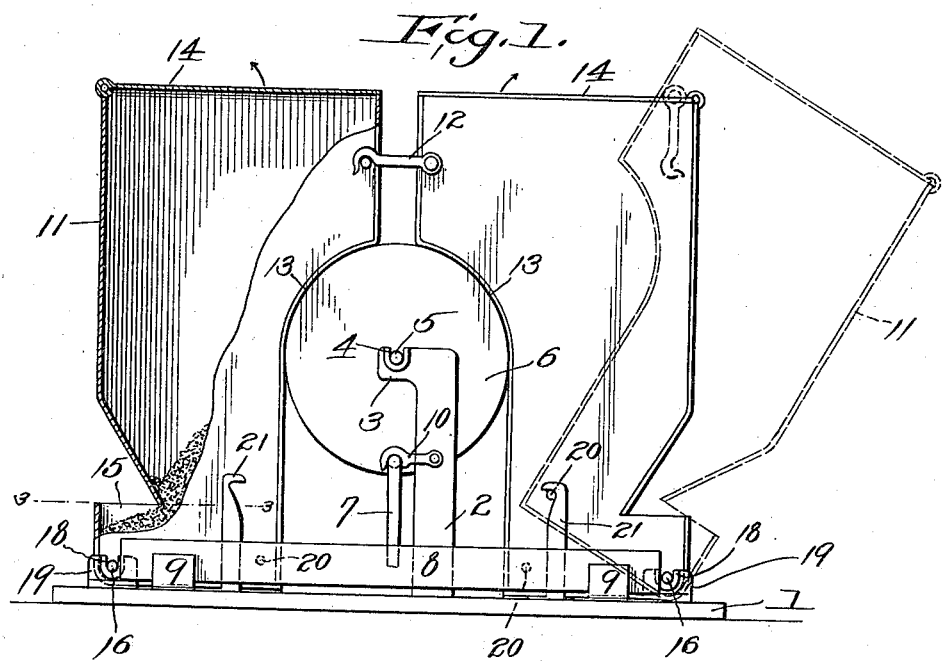
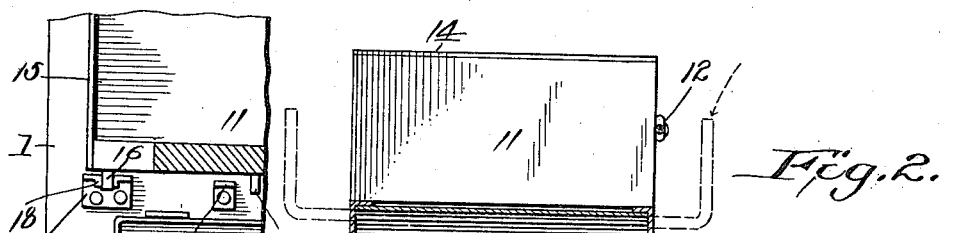
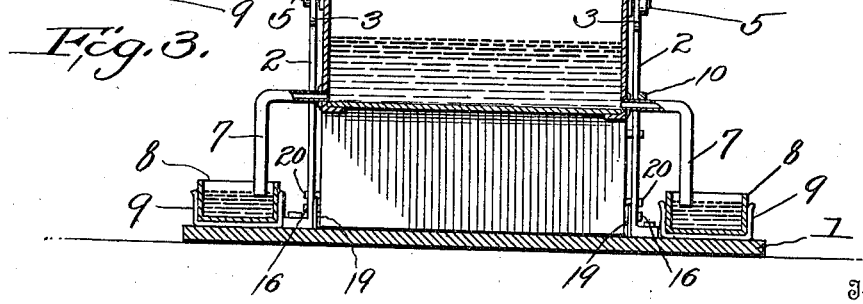

UNITED STATES PATENT OFFICE.

LORENZ SCHNEIDER, OF JONESBORO, ARKANSAS.

COMBINATION FEED-TROUGH AND WATER-FOUNTAIN.

1,030,130.     Specification of Letters Patent.     Patented June 18, 1912.

Application filed December 6, 1911. Serial No. 664,249.

*To all whom it may concern:*

Be it known that I, LORENZ SCHNEIDER, a subject of the Emperor of Germany, residing at Jonesboro, in the county of Craighead and State of Arkansas, have invented certain new and useful Improvements in Combination Feed-Troughs and Water-Fountains, of which the following is a specification.

The present invention relates to a combination feed trough and water fountain which embodies novel features of construction whereby a fresh supply of feed and water may always be provided for poultry and the like.

The object of the invention is to provide a device of this character which is compact and durable in its construction, which admits of the feed hoppers and water tank being quickly filled when necessary, and which can also be easily taken apart and cleaned when necessary.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which—

Figure 1 is a side elevation of a combination feed trough and water fountain constructed in accordance with the invention, a portion of one of the feed hoppers being shown in section and the opposite feed hopper being shown by dotted lines in the position assumed when tilted to one side. Fig. 2 is a transverse sectional view through the device, and Fig. 3 is a horizontal sectional view through a portion of one of the feed hoppers, the said view being taken on the line 3—3 of Fig. 1.

Corresponding and like parts are referred to in the following description and indicated in all the views of the drawing by the same reference characters.

Specifically describing the present embodiment of the invention, the numeral 1 designates the base which may be of any suitable construction and upon which the feed trough and water fountain is mounted. Projecting upwardly from opposite sides of the base are the standards 2 which are provided at the upper ends thereof with laterally projecting arms 3 having bearing notches 4 therein. These bearing notches 4 are designed to receive the trunnions 5 which project axially from opposite ends of a substantially cylindrical water reservoir 6. The opposite ends of the water reservoir are also provided at points near the periphery of the reservoir with the lateral spouts 7. When it is desired to fill the reservoir, the spouts 7 are swung upwardly into the position indicated by dotted lines in Fig. 2. Water can then be poured into one of the spouts, and air will escape through the opposite pipe. After the tank or reservoir has been filled, the discharge spouts 7 will be swung downwardly so that the ends thereof project into water troughs 8 which are mounted upon opposite sides of the base and may be received within the positioning clips or yokes 9. These water troughs are removable and can be readily detached from the device for the purpose of cleaning the same. A hook member 10 is pivoted upon one of the standards 2 and serves to engage one of the spouts 7 to hold the tank 6 against rotary movement when the spouts 7 have been swung downwardly into the troughs 8. The water within the troughs 8 normally forms a water seal for the two spouts 7 so that water does not flow through the same from the tank 6. It will be obvious, however, that as soon as the level of the water within either of the troughs 8 falls below the end of the spout 7, air will enter the reservoir 6 through the spout and water will flow from the reservoir into the trough until the level of the water within the trough again rises above the end of the spout. In this manner water is automatically supplied to the troughs as it is exhausted therefrom by the poultry.

A feed hopper 11 is mounted upon the base 1 on each side of the reservoir 6, the upper ends of the feed hoppers projecting over the water reservoir and being connected by a hook member 12. The inner faces of the feed hoppers have curved portions 13 which fit over the cylindrical reservoir and frictionally engage the same to hold the reservoir against rotary movement. It will also be obvious that the portions of the feed hoppers projecting over the reservoir prevent the reservoir or tank 6 from being lifted from the bearing notches 4 of the standards 2. Each of the feed hoppers is provided with a hinged cover 14 through which feed may be placed in the hoppers at any time. The outer faces of the feed hoppers are notched toward the bottom thereof as indicated at 15 to provide the usual opening through which access may be had to the feed. The feed above the notched portion 15 is supplied automatically to the portion of the hopper below the notch as it is exhausted by the poultry.

The lower and outer corner of each of the feed hoppers 11 is provided with the trunnions 16 which are mounted within bearing notches 18 formed in ears 19 projecting upwardly from the base 1. When the hook 12 between the upper ends of the hoppers is released, the two hoppers are designed to be swung outwardly away from the water tank 6 about the trunnions 16 as an axis thereby enabling the tank 6 to be lifted from position. The outward swinging movement of the feed hoppers 11 is limited by the engagement of stop pins 20 with hook members 21 projecting upwardly from the base. With the above construction, it will be obvious that the feed hoppers can be bodily lifted from position when it is desired to clean the same, although when it is merely desired to obtain access to the water tank 6, the feed hoppers can be swung outwardly away therefrom, as indicated by dotted lines in Fig. 1. A very compact construction is thus provided for supplying feed and water to poultry and the like, the water tank being completely protected by the feed hoppers so that it can not be accidentally displaced or turned out of operative position.

Having thus described the invention, what I claim as new and desire to secure by Letters Patent, is:—

1. The combination of a base, standards projecting from the base and formed with bearing notches, a tank provided at the ends thereof with trunnions which are removably received within the bearing notches, a trough upon the base, a lateral spout projecting from the tank and adapted to be swung upwardly for the purpose of filling the tank, the said spout being normally swung downwardly so as to project into the trough and cause the water in the tank to feed automatically to the trough, and feed hoppers mounted upon the base on each side of the tank, the said feed hoppers projecting from the tank and frictionally engaging the same to hold it in position and prevent accidental rotation thereof.

2. The combination of a base, standards projecting from the base and formed with bearing notches, a tank provided at the ends thereof with trunnions which are loosely received within the bearing notches, a water trough upon the base, a lateral spout projecting from the tank, the tank being adapted to be turned to bring the spout to the top of the tank for the purpose of filling the same, and the said spout normally projecting into the trough so as to cause the water in the tank to automatically feed into the trough as it is exhausted therefrom, feed hoppers pivoted upon the base on each side of the water tank, the said feed hoppers normally projecting over the water tank and engaging the same to hold the water tank in position, and being adapted to be swung outwardly away from the water tank when it is desired to remove the water tank from position, and means for limiting the outward swinging movement of the feed hoppers.

3. The combination of a base, standards projecting from the base and formed with bearing notches, a substantially cylindrical water tank provided at the ends thereof with axially disposed trunnions which are loosely received within the bearing notches, a trough at each end of the water tank, clips upon the base for detachably engaging the troughs, lateral spouts projecting from opposite ends of the cylindrical tank at points near the periphery thereof, the tank being adapted to be turned to bring the spouts to the top thereof when filling the tank and the spouts normally projecting from the bottom of the tank into the water troughs so that the water feeds automatically from the tanks to the trough as it is exhausted from the troughs, ears projecting from the base on each side of the tank, feed hoppers formed with trunnions which are journaled upon the ears, the said feed hoppers normally projecting from the water tank and engaging the same to hold it against displacement and being adapted to be swung outwardly when it is desired to remove the water tank, stop pins upon the feed hoppers, and hook members projecting from the base for engaging the stop pins to limit the outward swinging movement of the feed hoppers.

In testimony whereof I affix my signature in presence of two witnesses.

LORENZ SCHNEIDER.

Witnesses:
J. J. RIGA,
CURRY RAY.